(12) United States Patent
Dewanjee et al.

(10) Patent No.: US 6,793,864 B1
(45) Date of Patent: *Sep. 21, 2004

(54) POLYURETHANE MATERIAL FOR TWO AND THREE PIECE GOLF BALLS

(75) Inventors: Pijush K. Dewanjee, Oceanside, CA (US); Michael Tzivanis, Seneca, SC (US)

(73) Assignee: Dunlop Sports, Westminster, SC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 71 days.

This patent is subject to a terminal disclaimer.

(21) Appl. No.: 09/018,283

(22) Filed: Feb. 4, 1998

Related U.S. Application Data

(60) Provisional application No. 60/039,817, filed on Feb. 26, 1997.

(51) Int. Cl.[7] ............ A63B 37/12; A63B 45/00; B29C 39/10; C08G 18/32; C08G 18/48

(52) U.S. Cl. ............ 264/279.1; 156/146; 264/259; 264/260; 264/271.1; 264/275; 264/277; 264/279; 473/351; 473/356; 473/357; 473/365; 473/371; 473/377; 473/378; 528/61; 528/64; 528/67; 528/76; 428/423.1

(58) Field of Search ............ 156/146; 264/259, 264/260, 271.1, 275, 277, 279, 279.1; 473/351, 356, 357, 365, 371, 377, 378; 528/61, 64, 67, 76; 428/423.1

(56) References Cited

U.S. PATENT DOCUMENTS

| | | | |
|---|---|---|---|
| 2,117,400 A | 5/1938 | Cobb | 425/116 |
| 3,112,521 A | 12/1963 | Ward | 425/126.1 |
| 3,130,102 A | 4/1964 | Watson et al. | 156/228 |
| 3,147,324 A | 9/1964 | Ward | 264/254 |
| 3,177,280 A | 4/1965 | Ford et al. | 264/275 |
| 3,989,568 A | 11/1976 | Isaac | 156/213 |
| 4,123,061 A | 10/1978 | Dusbiber | 273/220 |
| 4,631,298 A * | 12/1986 | Presswood | 521/163 |
| 5,002,806 A | 3/1991 | Chung | 528/62 |
| 5,334,673 A | 8/1994 | Wu | 525/453 |
| 5,654,085 A | 8/1997 | Markusch et al. | 428/221 |
| 5,692,974 A | 12/1997 | Wu et al. | 473/377 |
| 5,704,852 A * | 1/1998 | Kato et al. | 473/357 |
| 5,733,428 A | 3/1998 | Calabria et al. | 264/134 |
| 5,888,437 A | 3/1999 | Calabria et al. | 264/135 |
| 5,897,884 A | 4/1999 | Calabria et al. | 425/116 |

FOREIGN PATENT DOCUMENTS

| | | |
|---|---|---|
| DE | 197 32 313 A1 | 2/1998 |
| EP | 0 219 709 A2 | 4/1987 |
| EP | 0 312 374 A2 | 4/1989 |
| EP | 0 570 798 A1 | 11/1993 |
| GB | 2301291 | * 12/1996 |

* cited by examiner

*Primary Examiner*—Rabon Sergent
(74) *Attorney, Agent, or Firm*—Lorusso Loud & Kelly LLP

(57) ABSTRACT

A novel composition useful for golf ball covers that comprises a blend of a diisocyanate/polyol polyurethane prepolymer with a curing agent comprising a blend of slow-reacting diamine with a fast-reacting diamine such as dimethylthio 2,4-toluenediamine and diethyl 2,4-toluenediamine, respectively. A golf ball cover made with this composition exhibits the characteristic feel and playability of a balata cover with superior durability characteristics (cut and shear resistance) which exceed those of a balata or ionomer cover.

4 Claims, 5 Drawing Sheets

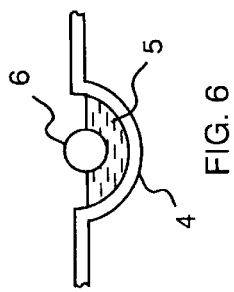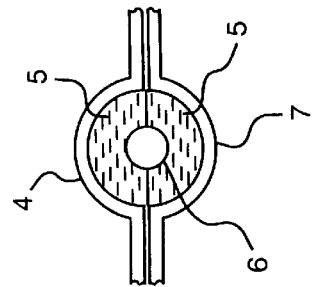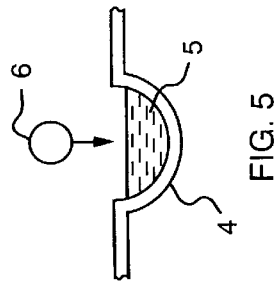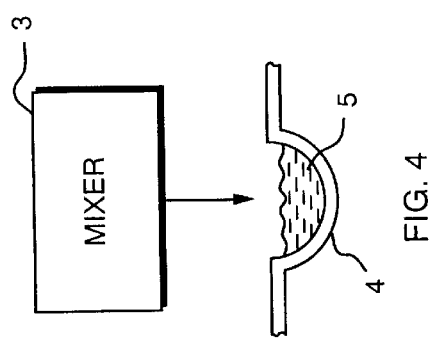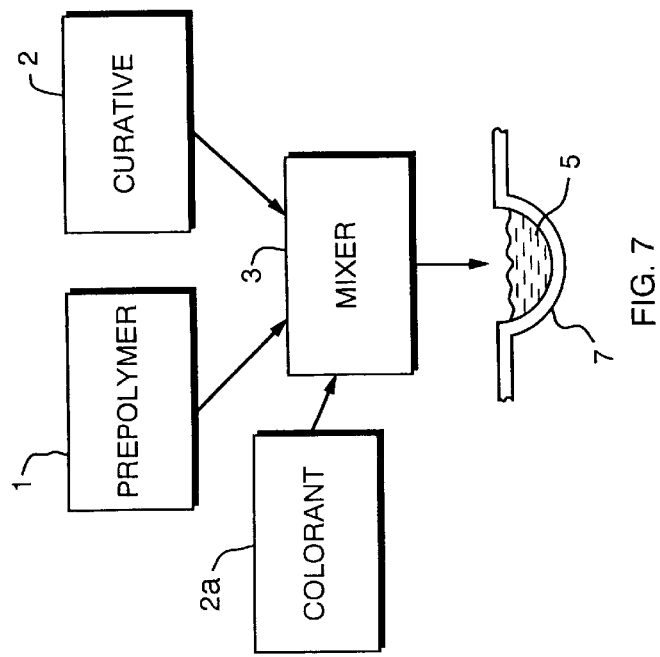

POLYURETHANE MATERIAL FOR TWO AND THREE PIECE GOLF BALLS

CROSS-REFERENCE TO RELATED APPLICATION

A claim of priority is made to U.S. Provisional Application Serial No. 60/039,817, filed Feb. 26, 1997, the contents of which are incorporated herein by reference.

BACKGROUND OF THE INVENTION

1. Field of the Invention

This invention relates to novel chemical compositions for golf ball covers that provide improved manufacturability and playability characteristics.

2. Description of the Related Art

Until the late 1960's, most golf balls were constructed with a thread wound core and a cover of compounds based on natural (balata and gutta percha) or synthetic transpolyisoprene. These golf balls have been and are still known to provide good flight distance. Additionally, due to the relative softness of the balata cover, skilled golfers can impart various spins on the ball in order to control the ball's flight path (e.g., "fade" or "draw") and "bite" characteristics upon landing on a green.

"Fade" is the term used in golf to describe a particular golf ball flight path that is characterized by a curved or arched flight exhibited towards the latter portion of the flight path that veers off from the center line of the initial flight path to the right of a right-handed golfer. Upon contact with the ground, a ball hit with "fade" will stop in a relatively short distance. "Fade" results from imparting clockwise sidespin on the golf ball.

"Draw" is the term used in golf to describe a particular golf ball flight path that is characterized by a curved or arched flight exhibited towards the latter portion of the flight path that veers off from the center line of the initial flight path to the left of a right-handed golfer. Upon contact with the ground, a ball hit with "draw", unlike a ball hit with "fade", will roll for a considerable distance until coming to rest. "Draw" results from imparting counter-clockwise sidespin on the golf ball.

"Bite" is the term used in golf to describe the effect of imparting a substantial amount of backspin to an approach shot to a green which causes the golf ball to stop abruptly upon contact with the green.

Another desirable feature of balata-based compounds is that they are readily adaptable to molding. These compounds therefor can be easily compression molded about a spherical core to produce golf balls.

Though possessing many desirable properties, there are substantial drawbacks to use of balata or transpolyisoprene-based compounds for golf ball covers. From a manufacturing standpoint, balata-type materials are expensive and the manufacturing procedures used are time consuming and labor-intensive, thereby adding to the material expense. From a player's perspective, golf balls constructed with balata-based covers are very susceptible to being cut from mishits and being sheared from "sharp" grooves on a club face. As a result, they have a relatively short life span.

In response to these drawbacks to balata-based golf ball covers, the golf ball manufacturing industry has shifted to the use of synthetic thermoplastic materials, most notably ionomers sold by E. I. DuPont De Nemours & Company under the name SURLYN.

Thread wound balls with ionomer covers are less costly to manufacture than balls with balata covers. They are more durable and produce satisfactory flight distance. However, these materials are relatively hard compared to balata and thus lack the "click" and "feel" of a balata covered golf ball. "Click" is the sound emitted from the impact of a golf club head on a golf ball. "Feel" is the overall sensation transmitted to the golfer through the golf club after striking a golf ball.

In an attempt to overcome the negative factors of the hard ionomer covers, DuPont introduced low modulus SURLYN ionomers in the early 1980's. These SURLYN ionomers have a flexural modulus of from about 3000 to about 7000 PSI and hardness of from 25 to about 40 as measured on the Shore D scale—ASTM 2240. The low modulus ionomers are terpolymers, typically of ethylene, methacrylic acid and n- or iso-butylacrylate, neutralized with sodium, zinc, magnesium or lithium cations. E. I. DuPont De Nemours & Company has disclosed that the low modulus ionomers can be blended with other grades of previously commercialized ionomers of high flexural modulus from about 30,000 to 55,000 PSI to produce balata-like properties. However, "soft" blends, typically 52 Shore D and lower (balata-like hardness), are still prone to cut and shear damage.

The low modulus ionomers when used without blends, produce covers with very similar physical properties to those of balata, including poor cut and shear resistance. Worse, wound balls with these covers tend to go "out-of-round" quicker than wound balls with balata covers. Blending with hard SURLYN ionomers was found to improve these properties.

Another approach taken to provide a golf ball cover that has the playing characteristics of balata is described in U.S. Pat. No. 5,334,673 ("the '673 patent") assigned to the Acushnet Company. The '673 patent discloses a cover composition comprising a diisocyanate, a polyol and a slow-reacting polyamine curing agent. The diisocyanates claimed in the '673 patent are relatively fast reacting. Due to this fact, catalysts are not needed to lower the activation energy threshold. However, since relatively fast-reacting prepolymer systems are used, the reaction rate cannot be easily controlled thereby requiring the implementation of substantial processing controls and precise reactant concentrations in order to obtain a desired product.

To avoid the problems associated with fast-reacting prepolymer systems, slow-reacting systems such as Toluene diisocyanate (TDI) prepolymer systems can be employed. However, these systems, while avoiding the problems associated with fast-reacting systems, present similar problems, albeit for different reasons. The most noteworthy problem with slow-reacting pre-polymer systems is the requirement for a catalyst.

By introducing a catalyst into the system, processing problems similar to those associated with fast-reacting prepolymer systems are virtually inevitable. As is well known in the art, the use of a catalyst can severely restrict the ability to control the speed of the reaction, which is undesirable.

It has now been discovered that a blend of diamine curing agents with slow-reacting prepolymer systems eliminates the problems associated with catalysts while maintaining the advantages associated with slow-reacting prepolymer systems. Accordingly, it is an object of the present invention to provide a golf ball cover composition that does not require a catalyst.

It is another object of the present invention to provide a golf ball having a synthetic cover material that achieves the click, feel, playability and flight performance qualities of balata covered golf balls.

It is yet another object of the invention to provide a polyurethane formula that achieves hardness characteristics similar to those associated with balata without compromising the durability of the polyurethane material. In contrast, polyurethane systems such as those disclosed in the '673 patent produce relatively high hardness ranges that obviate the possibility of providing a polyurethane system that can truly mimic the feel and playability of a balata-based product.

A further object of the present invention is to provide a golf ball cover material that has improved process manufacturing as well as improved durability and resilience over balata.

SUMMARY OF THE INVENTION

Polyurethane compositions comprising the reaction of a polyurethane prepolymer and a curing agent are disclosed. The prepolymer comprises a diisocyanate such as Toluene diisocyanate (TDI) and a polyol such as polytetramethylene ether glycol (PTMEG). The curing agent is a blend of a slow-reacting diamine with a fast-reacting diamine such as dimethylthio 2,4-toluenediamine and diethyl 2,4-toluenediamine, respectively.

In a preferred embodiment, TDI prepolymer having a low free isocyanate content (low free TDI) is used to reduce adverse effects that can arise from exposure to unreacted isocyanate. The curing agent blend provides flexibility to the formulation by eliminating the need for a catalyst.

The present invention provides a composition suitable for molding a durable golf ball cover with the desirable characteristics of a balata golf ball cover.

These and other objects and features of the present invention will be apparent from a reading of the following detailed description of the invention.

BRIEF DESCRIPTION OF THE DRAWINGS

FIG. 4 is a schematic of one step of the molding process according to one embodiment of the invention.

FIG. 5 is a schematic of another step of the molding process according to one embodiment of the invention.

FIG. 6 is a schematic of a further step of the molding process according to one embodiment of the invention.

FIG. 7 is a schematic of a still further step of the molding process according to one embodiment of the invention.

FIG. 8 is a schematic of yet another step of the molding process according to one embodiment of the invention.

FIG. 9 is a schematic of a yet further step of the molding process according to one embodiment of the invention.

DETAILED DESCRIPTION OF THE INVENTION

Figure 3:
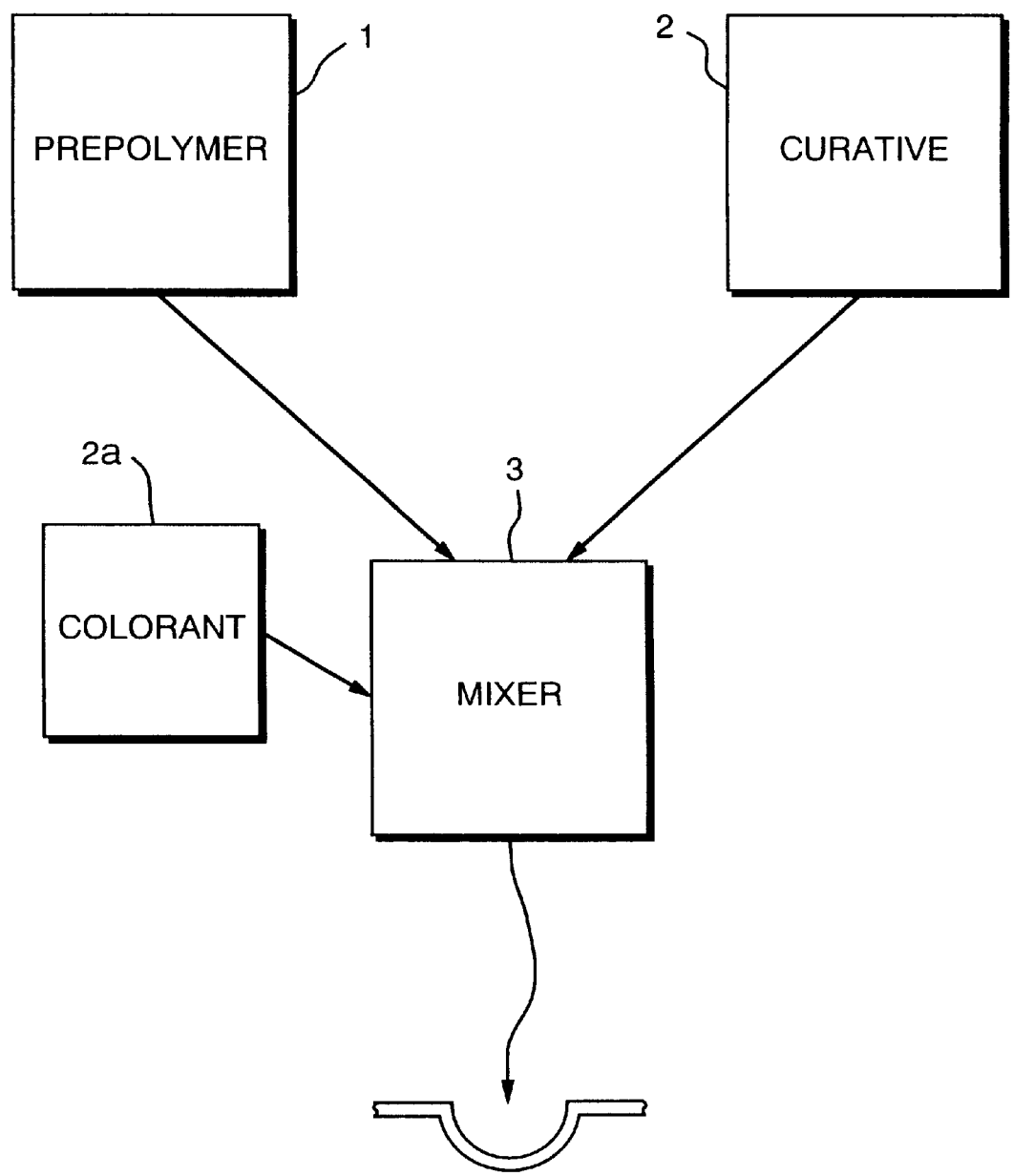
FIG. 3 is a schematic of a first step of the molding process according to one embodiment of the invention.
Figure 11:
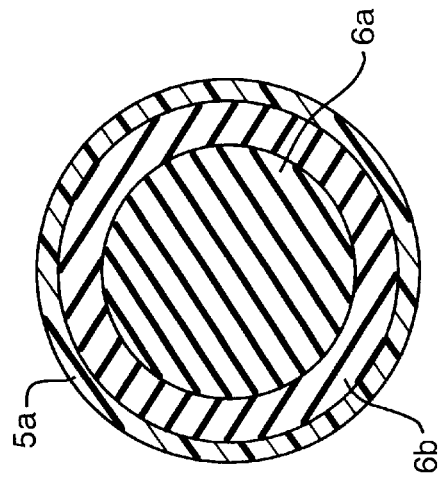
FIG. 11 displays a cross sectional view of a three-piece golf ball.
Figure 10:
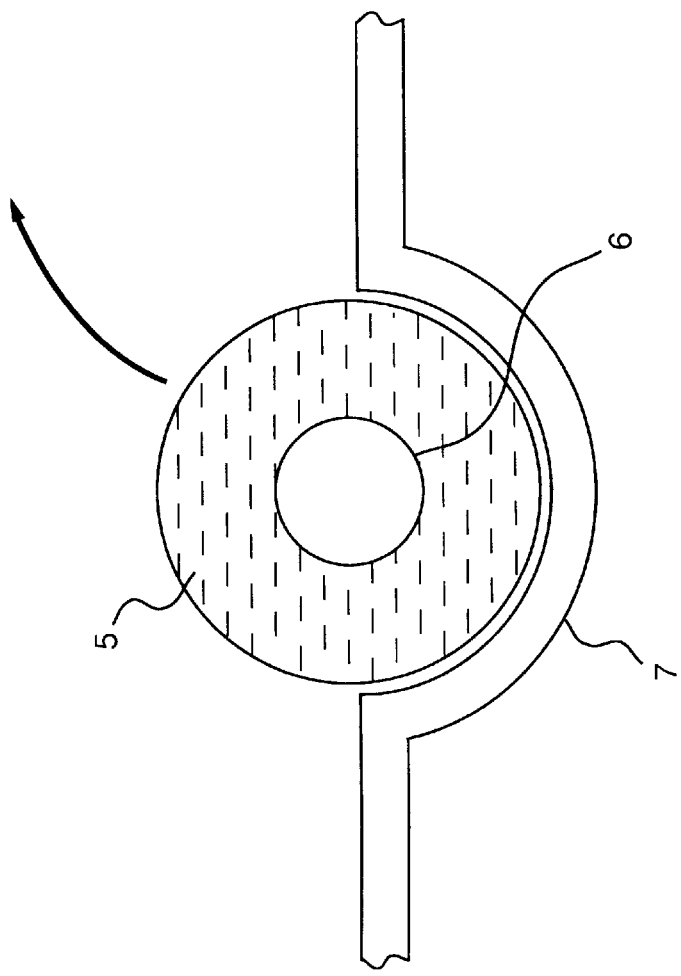
FIG. 10 is a still another step of the molding process according to one embodiment of the present invention.

As is well known in the art, polyurethane can result from a reaction between an isocyanate-terminated polyurethane prepolymer and a curing agent. As shown in FIG. 3, the polyurethane prepolymer is produced when a diisocyanate is reacted with a polyol. The prepolymer is then reacted with the curing agent. The curing agent can be either a diamine or a polyol. Production of the prepolymer before addition to the curing agent is known as the prepolymer process. In what is known as a one-shot process, the three reactants, diisocyanate, polyol and curing agent are combined in one step. Of the two processes, the prepolymer process is preferred since it allows for greater control over the reaction. Nevertheless, the present invention can be produced using either process.

In one embodiment as shown in FIGS. 3–10, the prepolymer comprised of diisocyanate and polyol is heated to approximately 140° F. while the curing agent is heated to approximately 72° F. The two materials are then mixed in the mixer and poured into a first set of golf ball mold halves and allowed to cure for approximately 55 to 60 seconds. While the polyurethane is still hot, a golf ball center is suspended in the mold halves until the polyurethane has partially cured. A second set of mold halves is then filled with the same polyurethane mixture. The first set of mold halves are then inverted and placed over the second mold halves so that a complete ball is produced. The specifics of the process are explained in greater detail below.

Of notable importance to the present invention is the variety of curing agents that have been previously used to produce urethane elastomers. For example, the curing agents disclosed in the '673 patent are slow-reacting polyamines or polyols. As described in the '673 patent, slow-reacting polyamines are diamines that have amine groups which are sterically and/or electronically hindered by electron withdrawing groups or bulky groups situated proximate to the amine reaction sites. The spacing of the amine reaction sites will also affect the reactivity speed of the polyamines.

When slow-reacting polyamines are used as the curing agent to produce urethane elastomers, a catalyst is typically needed to promote the reaction between the urethane prepolymer and the curing agent. Unfortunately, as is well known in the art, the use of a catalyst can have a significant effect on the ability to control the reaction and thus, on the overall processibility.

To eliminate the need for a catalyst, a fast-reacting curing agent can be used. Such fast-reacting curing agents, e.g., diethyl-2,4-toluene diamine, do not have electron withdrawing groups or bulky groups that interfere with the reaction groups. However, the problem with lack of control associated with the use of catalysts is not completely eliminated since fast-reacting curing agents are also relatively difficult to control.

It has now been discovered that a blend of a slow-reacting curing agent and a fast-reacting curing agent eliminates the problems associated with using either type of curing agent in isolation. The ultimate result of such a combination is the realization of greater control and concomitant flexibility over the reactions used to produce urethane elastomers.

In accordance with the present invention, the curing agents used are substantially as shown below:

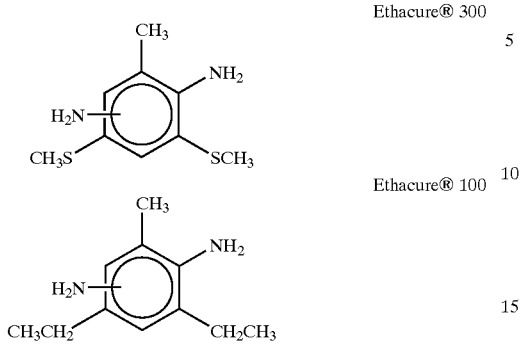

Ethacure® 300

Ethacure® 100

One advantage that warrants immediate mention is the elimination of a post cure period. One of the major drawbacks with prior systems is the requirement for a post cure period during which other components of a golf ball can be detrimentally affected by the curing process. For example, it is not unusual for golf balls made with known polyurethane systems to require a post cure at temperatures exceeding 140° F. for over eight hours. Three-piece golf balls with rubber windings exhibit reduced compression when exposed to such "high temperature" post cure conditions. Specifically, when rubber windings are used in three-piece golf balls, long exposure to high heat leads to relaxation of the windings or thread and hence reduction in compression values and initial velocity. With the curing agent blend of the present invention, the problems associated with a post cure period are effectively eliminated.

With respect to the diisocyanate component, it is well known in the golf ball industry that toluene diisocyanate (TDI) provides additional processing flexibility to the system unlike any other diisocyanate tested. For example, when 4,4'-diphenylmethane diisocyanate (MDI) is used, the ratio tolerances (prepolymer-to-curing-agent ratio) are much less flexible compared to when TDI is used. Unless strict ratios are adhered to, urethane polymers made with MDI will not have the desired end properties, such as hardness and compression.

A still further problem with MDI is that it reacts much faster when reacted with an amine curing agent than does TDI. Thus, some of the control achieved by using the aforementioned curing agent blend is lost when MDI is used.

An additional disadvantage with a MDI-based system is the need for an elevated curing temperature even though a post-cure period is eliminated by the curing agent blend. Although MDI-based systems can be cured at room temperature by using curing agents such as Polamine® (Polaroid Corporation), the system is cost prohibitive. Polamine® costs as much as four times the equivalent amount of the curing agents used in the present invention. This renders the use of Polamine® much less cost effective.

In contrast, a TDI-based system is essentially a low-cost "room temperature cure system" in that once the TDI-based polyurethane prepolymer is reacted with the curing agent blend, the composition can be cured at room temperature. This prevents any adverse effects an elevated curing temperature could have on the threading and/or core of the golf ball being produced.

Accordingly, in order to maximize the reaction control obtained by using the curing agent blend, TDI has proven to be the best choice for the diisocyanate component. A TDI-based polyurethane system not only complements but enhances the slow reacting system achieved using the curing agent blend. The diisocyanate used in accordance with the present invention is substantially the diisocyante shown below:

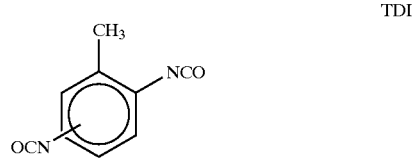

TDI

A similar situation was discovered when selecting the polyol component. For the slow curing system of the present invention, the preferred polyol is polytetramethylene ether glycol (PTMEG). Like urethane elastomers made with other ether polyols, urethane elastomers made with PTMEG exhibit good hydrolytic stability and good tensile strength. Hydrolytic stability allows for a golf ball product that is substantially impervious to the effects of moisture. Thus, a golf ball made with a polyurethane system that has an ether glycol for the polyol component will have a longer shelf life, i.e., retains physical properties under prolonged humid conditions.

Unlike urethane elastomers made with other ether polyols, e.g., polypropylene. ether glycol, urethane elastomers made with PTMEG exhibit superior dynamic properties such as coefficient of restitution (COR) and Bashore rebound. The polyurethane-polyurea cross links that are formed, when PTMEG is used with a diamine curing agent, provide good thermal stability under elevated temperatures. As a result, hardness stability can be achieved. The polyol used in accordance with the present invention is substantially as shown below:

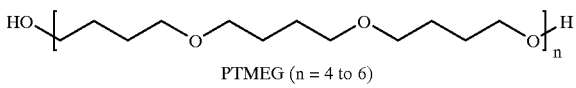

PTMEG (n = 4 to 6)

The polyurethane compositions of the invention are prepared by reacting a prepolymer of a duisocyanate and a polyol. The prepolymer must have an NCO% content of between 5.5% and 8.0% by weight of the prepolymer. Preferably the NCO% content.is about 6% by weight. In a preferred embodiment, 100 grams of a prepolymer comprising low free TDI and PTMEG is heated to 140° F. in a vat 1 as shown in FIG. 3. To achieve a preferred stoichiometry of 95%, 13.2 grams of a curative, preferably a 50/50 blend of Ethacure 100 (dimethylthio 2,4-toluenediamine) and Ethacure 300, (diethyl 2,4-toluenediamine), in a second vat 2 at room temperature, (approximately 72° F.), is mixed with the polyurethane prepolymer in a mixer 3 as shown in FIG. 3. The mixture 5 is poured into a first open mold half 4 that is preheated to approximately 160° F. as shown in FIG. 4. The cure time or pot life for this mixture is approximately 55–70 seconds. After approximately 35 seconds, a golf ball core 6 is lowered into the mold half 4 containing "semi-gelled" polyurethane 5 as shown in FIG. 5. Shortly after the first open mold half 4 is filled with the polyurethane mixture 5, a second open mold half 7 is filled with the polyurethane mixture 5 as shown in FIG. 7. After approximately, 20–30 seconds, the first mold half 4 is mated with the second mold half 7 containing the same polyurethane prepolymer-diamine curing agent mixture by inverting the first mold half 4 as shown in FIGS. 8 and 9. After approximately four minutes of heating and three minutes of cooling, the golf ball is removed from the mold, and allowed to post cure at room temperature for 8–16 hours, FIGS. 9 and 10.

If desired, other ingredients, such as pigments, can be added to the mixture. In a preferred embodiment, a pigment 2a comprising 0.25–5% by weight of the total polyurethane prepolymer mixture can be added via a third stream to the mixhead at the time of adding the diamine curing agent to produce the desired color. In a preferred embodiment, the pigment shall consist of 65% $TIO_2$ and 35% carrier (typically a polyol, with or without toners) by weight of the combined prepolymer and curing agent, with or without a UV stabilizing package.

To achieve the desired results, the reactants should be reacted to obtain a stoichiometry of between about 92–105% and preferably 95%. With respect to the NCO% content, any prepolymer used should have an NCO% between about 5.5–8.0% by weight of the prepolymer and preferably about 6% by weight. Systems using TDI, IPDI (Isophorone diisocyanate) or MDI as the diisocyanate and an ether backbone are all possible choices for the polyurethane prepolymer. The polyol selected should have a molecular weight of between about 650–3000 and preferably between about 850–2000. The larger the molecular weight, the softer, and more flexible the polyurethane becomes. In the preferred embodiment, PTMEG having a molecular weight of about 1000 is used to obtain desired Bashore rebound and flexural modulus performance characteristics.

The curative should be a blend of a slow-reacting diamine and a fast-reacting diamine. In a preferred embodiment, slow-reacting dimethylthio-2,4-toluenediamine sold under the trade name Ethacure 300 by the Albermarle Corporation and fast-reacting diethyl-2,4-toluenediamine sold under the trade name Ethacure 100 by Albermarle, are combined at a ratio of between about 40:60–80:20. Polyurethanes having desirable physical properties have been achieved using the following Ethacure 300/Ethacure 100 blend ratios at the following equivalent weights, respectively: 40:60 at 95.76, 50:50 at 97.47, 60:40 at 99.24, 70:30 at 101.00 and 80:20 at 102.97.

As previously discussed, it is essential that a blend be used to eliminate the need for a catalyst. It has been discovered that the combination of Ethacure 100, which does not have the thio group, with Ethacure 300 enables the reaction to take place without the need of a catalyst while still achieving good gel times (a pot life of approximately 55–70 seconds). Due to the absence of the thio group, steric hindrance is not realized. However, Ethacure 100 used alone, acts rapidly and therefore does not provide the desired control over the reaction time. In contrast, Ethacure 300, due to steric hindrance, reacts much slower than Ethacure 100 and requires the undesired catalyst.

If a "room cure" formulation is desired, catalysts, such as Dabco 33 LV from Air Products, are not suitable since they provide exponential exothermic reactions. With few exceptions, once a catalyst is introduced into a urethane system, it is difficult, and, from a commercially practical standpoint, impossible to obtain a desired linear exothermic reaction. Without being able to control the temperature pattern of the reaction, it is difficult to obtain the desired physical properties since the physical properties are temperature sensitive. The curing agent blend of the present TDI-based system provides the desired linear exothermic reaction so that the desired end-product physical properties can be achieved.

It has been found that a blend of these two curatives allows the reaction time to be controlled. By varying the blend, the speed of the reaction can be controlled to obtain the desired characteristics. With a catalyst, the speed of the reaction cannot be as easily controlled, which ultimately leads to undesired physical properties.

A further surprising advantage of the new system using the Ethacure 300/100 blend is the elimination of a post-cure without losing the benefits of a post-cure period. With many prior art systems, compression is lost if a "high temperature" post-cure period is instituted. With the system of the present invention, good compression numbers can be achieved without a "high temperature" post-cure period. Moreover, curing can be performed at room temperature, i.e., 72° F.

A still further surprising advantage of the preferred curing agent blend is the flexibility in formula concentrations the new system provides. To change the resulting characteristics, one need only change the concentrations of the reactants. For example, hardness readings ranging from 50D–65D have been achieved by altering the molecular weight of the polyol component (PTMEG in the preferred embodiment), the NCO% content and/or the stoichiometry of the reaction. Even when the reactant concentrations are altered to achieve different hardness levels, good physical properties can be achieved within a range of alterations.

A yet further advantage, as is well known in the golf ball manufacturing industry, is that the ratio of polymer to curing agent is also more forgiving than other known systems. In contrast, for example, the system disclosed in the '673 patent requires the ratio to be "exact" in order to produce an acceptable polymer.

The following examples are provided to illustrate and further explain the aspects of the invention. These examples are set forth for purposes of illustration and do not limit the scope of the invention.

EXAMPLE 1

A 60 low free TDI-PTMEG polyurethane prepolymer was heated to 140° F. and mixed with a 50/50 blend of Ethacure 300 and Ethacure 100. The curing agent blend was maintained at room temperature before mixing. The exothermic reaction reached between 160°–170° F. with a gel time of approximately 65 seconds. The mixture was cured at room temperature for 12 hours.

When tested for hardness using a Shore D Durometer made by Shore Instrument and Mfg. Co., Inc., the composition exhibited a Shore D hardness of 51.0 when measured using ASTM method D-2240-91, "Indentation Hardness of Rubber and Plastic by Means of a Durometer." A Bashore Rebound measurement of 51% was obtained in accordance ASTM D2632 with a Shore Resiliometer also made by Shore Instrument and Mfg. Co., Inc.

Tensile data was compiled using ASTM D412. The composition produced an ultimate stress of 6269 psi, a Young's modulus reading of 5166 psi, a stress at 100% reading of 1909 psi and an elongation reading of 400–450% using ASTM D412. Elongation is a measurement of a material's elasticity up to its breaking point under a certain load. This type of tensile data is obtained because it can be correlated to the ultimate performance characteristics of the polyurethane cover such as cut resistance and shear resistance.

The composition exhibited a flexural modulus of 16650 psi which falls within the desired range of 15,000–30,000 psi using ASTM method D-790. With respect to the polyurethane system embodiments of the present invention, flexural modulus increases as Shore D hardness increases.

The final physical parameters tested relate to tear data obtained in accordance with ASTM D624, Die C ("Graves Tear"). The composition produced a maximum load reading of 512 lbf./in., (the load at which the material samples began to tear). An energy to break reading of 24.8 lbf./in. and a energy to yield reading of 18.0 lbf./in. were also obtained.

The foregoing test results demonstrate that a polyurethane material having superior processibility can be achieved that exhibits "high" elongation, tensile strength and tear strength. When used as the material for a golf ball cover, these physical properties translate into a golf ball cover material that exhibits superior cut, abrasion and shear resistance versus ionomers and balata when stuck by hard objects such as the grooved face of a metallic golf club head.

In addition to the physical parameter testing, the polyurethane mixture (low free TDI prepolymer mixed with a 50/50 blend of Ethacure 300/Ethacure 100) was subjected to two different post cure environments to determine the effects of the post cure on the physical properties of the polyurethane end product. One part of the mixture was cured at 105° F. ("room cure temperature") for approximately 10 hours. The mixture was then allowed to cool down for approximately two weeks before testing for physical properties. The identical mixture was cured at 220° F. ("extended cure") again for approximately 10 hours and allowed to cool down for approximately two weeks before testing for physical properties.

Figure 1:
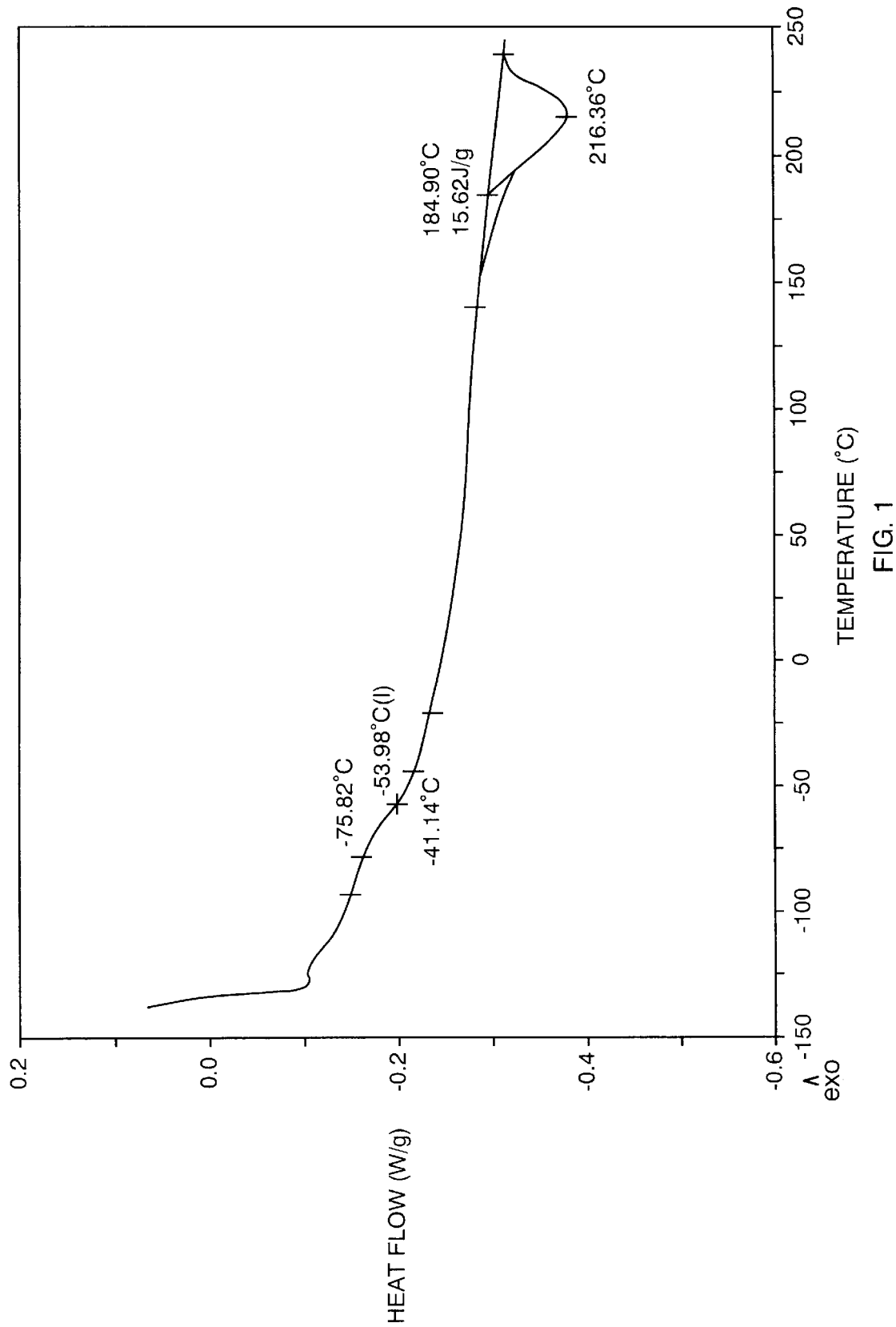
FIG. 1 is a Differential Scanning Calorimeter ("DSC") graph of one embodiment of the polyurethane system of the present invention using a "low temperature" golf ball cure, as desired.
Figure 2:
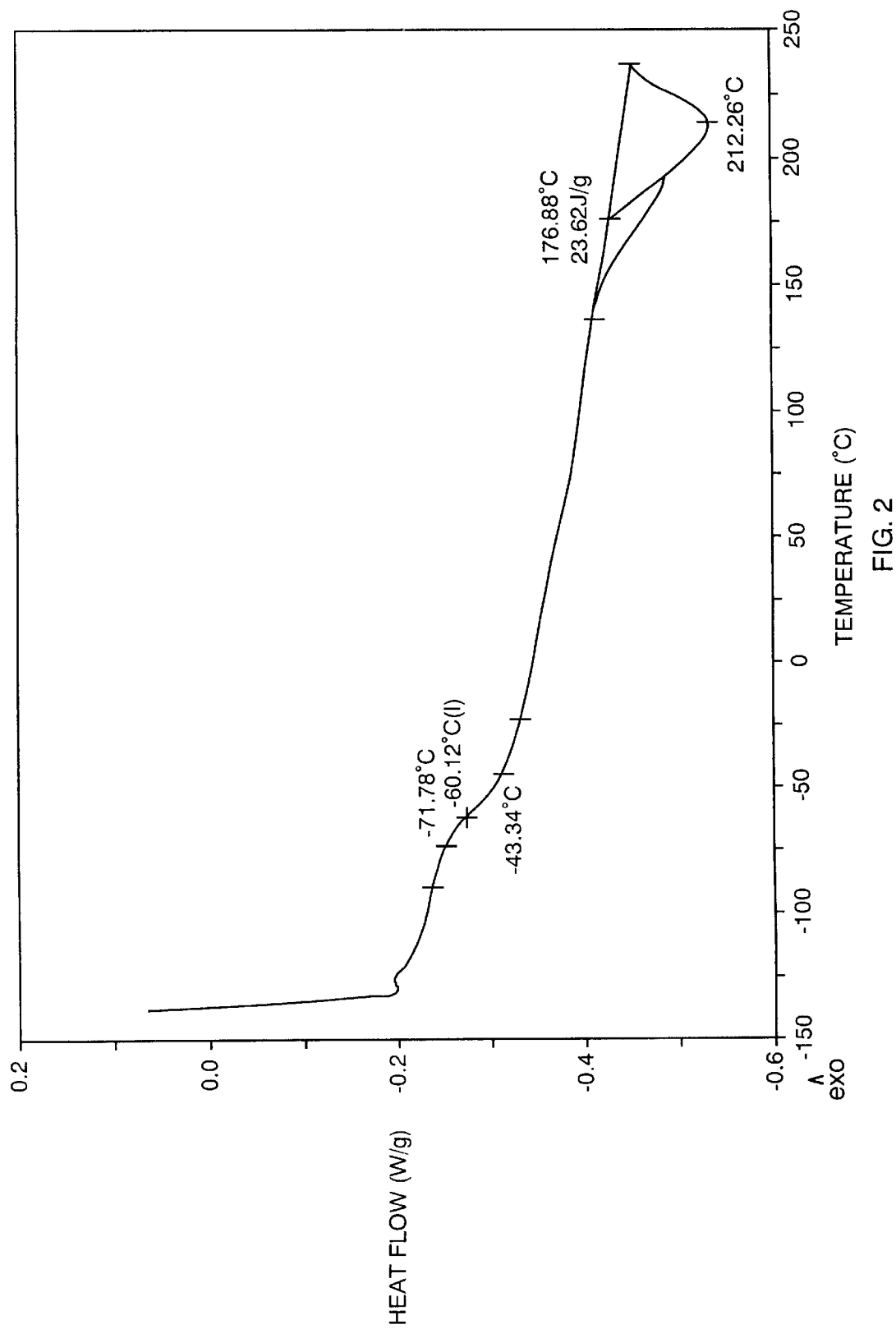
FIG. 2 is a DSC graph of the same embodiment as FIG. 1 using an extended "high temperature" golf ball cure.

FIG. 1 shows the DSC results for the "room cure" trial and FIG. 2 shows the results for the "extended cure" trial. As is clear from the test results, the DSC curves were virtually identical taking into account the accuracy of the testing apparatus and the testing method.

When the polyurethane products were tested for physical properties, the products exhibited similar physical properties. These results demonstrate that the polyurethane made with the curing agent blend could be cured without the need for a "high temperature" post cure period or "extended cure" period during which physical properties can be lost due to the exposure of the other golf ball components, e.g. windings and core, to high temperatures for long periods of time. By using the curing agent blend of the invention, with the elimination of a "high temperature" post cure period, physical properties such as initial velocity and compression can be maintained while achieving full reaction of the polyurethane reaction components.

EXAMPLES 2–4

Additional tests were run using the same low free TDI prepolymer with altered blend ratios of Ethacure 300/Ethacure 100. In each test, the prepolymer was heated to 140° F. and the curative blend was maintained at room temperature before being mixed. The tests were conducted to determine the blend effects on gel time and exothermic reaction.

When the blend ratio was set at 60:40 (E300 to E100), a gel time of 55–60 seconds was achieved. The exothermnic reaction reached 145° F. A 70:30 blend ratio produced a gel time of approximately 50 seconds and an exothermic reaction that reached 156° F. Lastly, an 80:20 blend ratio produced a gel time of approximately 45 seconds and an exothermic reaction the reached 165° F. All of the polyurethane end products of these tests were determined to have physical characteristics similar to those of the polyurethane produced using the 50:50 curing agent blend ratio.

These test results conclusively demonstrate the processibility advantages of the curing agent blend and the wide range of blend ratios that can be used to produce desired polyurethane end products. Depending on the amount of time needed to pour a particular number of golf ball molds with a single batch of the polyurethane prepolymer mix, a curing agent blend can be picked that will accommodate the speed requirements of the golf ball manufacturing process without having any appreciable effect on the physical characteristics of the end product.

As demonstrated by the preceding examples, there is a great deal of flexibility that can be built into the urethane elastomer system. The curing agent blend ratio can be modified to alter the speed of the reaction to accommodate the practitioner's needs while the diisocyanate NCO% content can be varied to achieve varying physical properties. No other urethane elastomer system is known by the inventors that provides such flexibility.

It will be appreciated that the instant specification and claims are set forth by way of illustration and not made without departing from the spirit and scope of the present invention.

We claim:

1. A method of making a golf ball comprising:
   (a) providirng a prepolymer comprised of a toluene diisocyanate and a polytetramethylene ether glycol having a molecular weight between about 650 to 3000 weight average, wherein said prepolymer has an NCO% content of about 5.5 to 8.0% and heating the polymer to about 140° F.;
   (b) providing a curative for use in casting, wherein said curative is free of catalysts, comprised of a first diamine dimethylthio-2,4-toluenediamine and a second diaminc diethyl-2,4-toluenediamine;
   (c) mixing the prepolymer with the curative in a mixer to create a polymer mixture wherein a pot life of approximately 55–70 seconds is formed;
   (d) pouring the mixture into a first mold half;
   (e) pouring the mixture into a second mold half;
   (f) lowering a golf ball core into the first mold half such that the golf ball is suspended in the polymer mixture;
   (g) inverting the first mold half and mating it to the second mold half;
   (h) heating the mated first and second mold halves containing the polymer mixture and the golf ball core;
   (i) cooling the mated first and second mold halves containing the polymer mixture and golf ball core; and,
   (j) removing the molded golf ball from the first and second mold halves and allowing the golf ball to cure.

2. The method according to claim 1 wherein the first and second mold halves are heated to about 160° F.

3. The method according to claim 2 wherein the polymer mixture is allowed to cure for approximately 35 seconds after being poured into the first mold half.

4. The method according to claim 3 wherein the polymer mixture is allowed to cure for approximately 20 to 30 seconds after being poured into the second mold half and before inverting and mating the first mold half with the second mold half.

* * * * *